March 3, 1959 B. J. EMANUEL 2,876,304
ELECTRIC TESTING APPARATUS
Filed Jan. 31, 1955 2 Sheets-Sheet 2

INVENTOR.
Bernard J. Emanuel
BY
ATTORNEYS

United States Patent Office 2,876,304
Patented Mar. 3, 1959

2,876,304

ELECTRIC TESTING APPARATUS

Bernard J. Emanuel, Denver, Colo.

Application January 31, 1955, Serial No. 485,232

4 Claims. (Cl. 200—46)

This invention relates to apparatus for testing electric devices and particularly to such apparatus which may be employed to test a wide range of devices of different types, and it relates specifically to an improved testing apparatus of the type employing coded plates or cards for securing the required operating connections for each type of device.

By way of example, the invention will be described as applied to a testing equipment for determining the condition of electron tubes, although the invention may be employed in other types of apparatus wherein it is desired to select required connections quickly and with minimum likelihood of error.

The rapid and efficient testing of electron tubes, such as radio receiving tubes, in a quick and efficient manner is complicated by the existence of a multitude of different types of tubes each requiring its individual set of connections for testing purposes. The tube testers in common use today are provided with a large number of manually operated switches for selecting the test connection and the operator is required to place the tube in a corresponding socket and to make the test after having set up the test connections by reference to a table which may be printed on a roll or cylinder mounted in the test unit. The setting up of the connections for each type of tube requires substantial time and in addition is subject to the possibility of error by the operator in following the notations on the chart or table when setting up the connections. If the connections selected are incorrect the results are, of course, erroneous; furthermore, there is a possibility that the tube on test will be damaged or destroyed because of the erroneous connections. In order to avoid the disadvantages of these separately selected connections, tester units have been devised wherein a punched card or plate is employed for each individual tube, the connections being determined by the punchings in the plate rather than by manual selection. Testing devices of this latter type have been complicated in construction and have not come into general use. Accordingly, it is an object of the present invention to provide in a testing apparatus of the type employing coded selection plates for individual devices, an improved switching arrangement for securing simplified and accurate selection of the circuits of the apparatus.

It is another object of this invention to provide in an electric testing apparatus an improved circuit selecting switching mechanism for effecting the required connections of a wide range of different types of devices to be tested and which is of simple construction and easy to operate. Further objects and advantages of this invention will become apparent as the following description proceeds and the features of novelty which characterize this invention will be pointed out with particularity in the claims annexed to and forming a part of this specification.

In carrying out the objects of this invention in one embodiment, an electron tube tester is provided which comprises a casing having on its top a plurality of electron tube sockets of the types presently in use. The usual indicating meter is provided and circuit connections are provided within the casing to a bank of normally closed switches lying in a common plane and arranged so that they may be separated by a card inserted through a slot in the side of the case. A card is provided for each tube and is cut or punched to provide openings or recesses such that when it is in position in the tester only those connections are made which apply to the tube to be tested. When the card is inserted in position, all circuits remain inactivated until the card has reached its final location and the operator presses the control button where it engages and activates a switch to energize the test circuits whereupon the meter indicates the condition of the tubes. The bank of normally closed switches comprises a plurality of separate conductor strips lying parallel to the direction of movement of the card and a plurality of resilient fingers having contacts engaging the strips and arranged so that they will be forced out of contact with the strips as the card moves into position and those fingers at the openings in the card will return to contact the strips.

For a better understanding of the invention, reference may be had to the accompanying drawings, in which.

Figure 1:
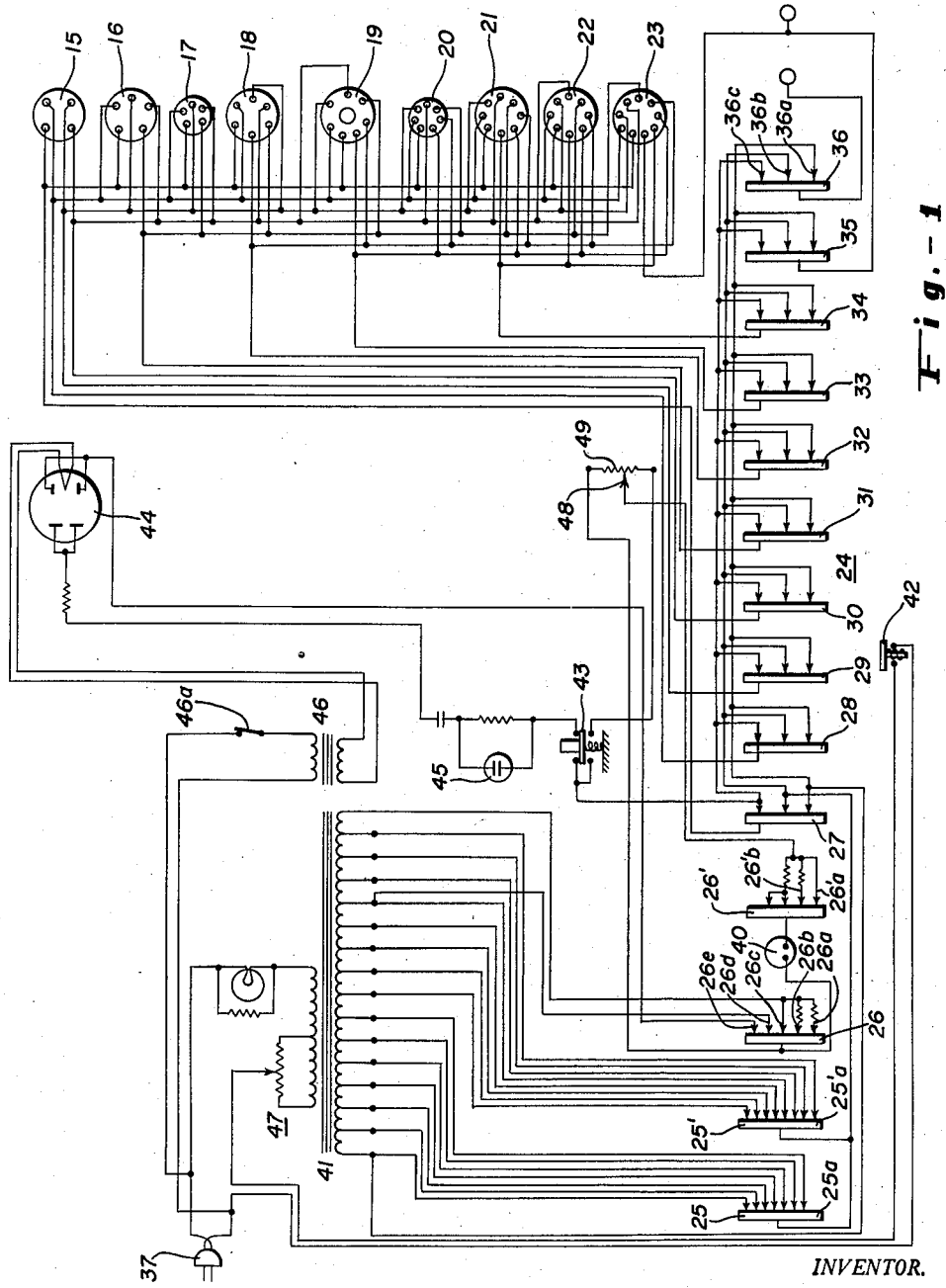
Fig. 1 is a schematic wiring diagram of an electronic tube testing unit embodying the invention.

Referring now to the drawing, the testing equipment shown in the circuit diagram in Fig. 1 comprises a bank of tube sockets numbered 15 through 23 inclusive and circuit connections including a bank 24 of normally closed switches numbered 25, 25', 26, 26', and 27 through 36 inclusive. Power is supplied to the tester through a plug connection 37 and circuit connections are provided so that each of the tube bases 15 through 23 may be connected in the required manner for the specific tube being tested so that a milliammeter 40 will provide an indication of the quality of the tube. This general type of testing equipment is well known in the art and it will be described herein only insofar as it is desirable to an understanding of the present invention. The switches 25 and 25' are two sections of the filament selecting circuits and are connected to a row of taps on the secondary of a transformer 41, the primary of which is connected across the power supply 37 through a normally open switch 42; this provides the full range of standard filament voltages. Provision is made for the usual short circuit test of the tube under control of a normally closed manual switch 43 which in its upper or normal position connects a double diode rectifier tube 44 in series with a neon indicator tube 45 and in circuit with the selected tube and across one of the higher voltage taps of the transformer 41 to secure an indication of the existence of a short circuit. The filament voltage of the rectifier tube 44 is supplied from the secondary of a transformer 46, the primary of which is connected across the supply 37 under control of a manual switch 46a. When the button switch 43 is pressed to its lower position, the tube tester is connected for the merit testing of a tube placed in one of the sockets 15 to 23 inclusive. The line voltage may be adjusted by moving of the potentiometer control indicated at 47 and the meter calibration may be adjusted by moving an adjustable control 48 to its desired position on the meter shunt resistance 49. The connections for the specific tube to be tested are determined by the selection of required ones of the switches 25 to 36 inclusive, one contact of each required one of these switch members being selected by operation of a selector card or plate in a manner described below. When the selector plate corresponding to the tube to be tested is in position and the voltages are correctly adjusted at the rheostats 47 and 49, the condition of the tube will be indicated by the meter 40.

Figure 2:
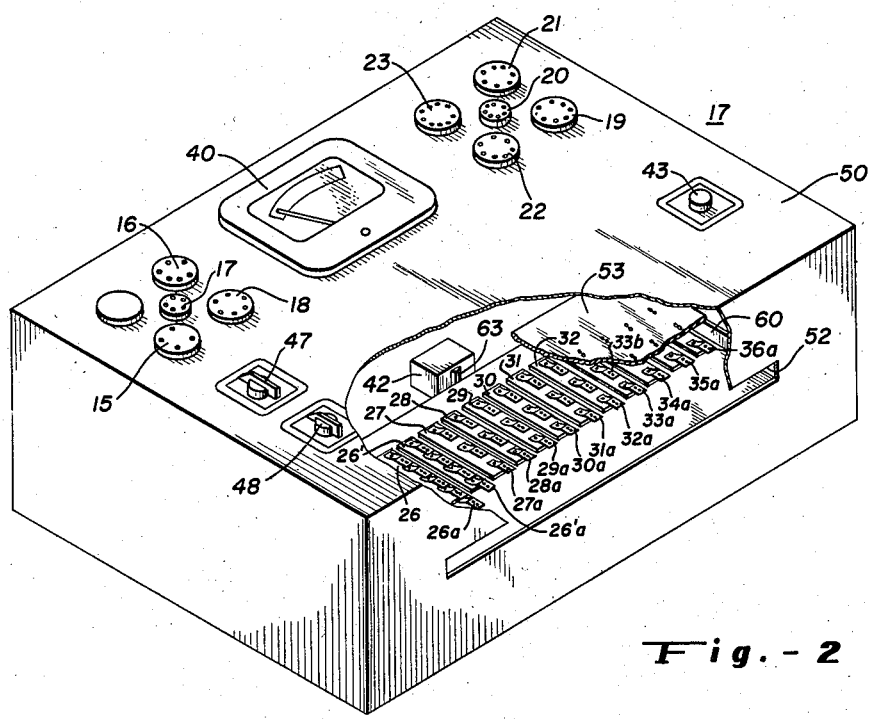
Fig. 2 is a perspective view of the tube testing unit embodying the invention partially cut away to show the interior thereof.
Figure 3:
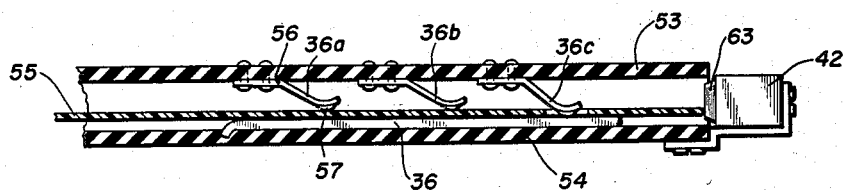
Fig. 3 is an enlarged sectional view of one of the switching elements of the unit of Fig. 2.
Figure 4:
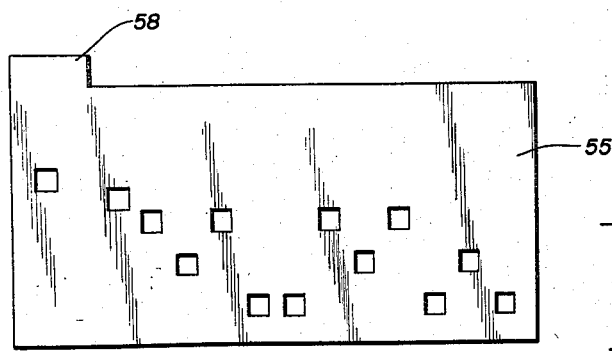
Fig. 4 is a plan view of a connection selecting card to be employed with the unit of Fig. 2.

The operation and construction of the selecting card or plate arrangement provided in accordance with this invention will be more readily understood from a consideration of Figs. 2, 3, and 4. As shown in Fig. 2 the testing unit comprises a case or housing 50 on the upper face of which are located the tube sockets or bases, the meter 40, the switch 43, and the line voltage and meter shunt adjusting elements 47 and 48. In order to insert the selecting plate or card and actuate the banks of switches 25 to 36 inclusive to provide the connections required for a specific tube, a slot 52 is provided in the side of the case 50. The banks of switches 25a to 36 are arranged in a plane in alignment with the slot 52 and their resilient contact members, which are shown in engagement with the conductor bars, are indicated by the same numerals with the suffix letters $a$, $b$, $c$, etc. In Fig. 1 only, the contact members for the bars 26 and 36 have been indicated by the corresponding numerals in order to avoid unnecessary crowding of numerals in the drawing. The resilient contact members of the switch assembly are mounted on an insulatig plate support 53 which together with a second similar plate 54 defines the passage through which the card is inserted from the slot 52, a card 55 being indicated in position in the sectional elevation view of the switch assembly in Fig. 3. Each of the switch members comprises a resilient finger 56 and a rounded camming foot 57 which is normally in engagement with the respective conductor bar of the switching element. In each row of switching elements only one element will engage the bar when the card is in position and as shown in Fig. 3 the element 36c is providing contact with the bar. As shown in Fig. 4 the card 55 is of rectangular form and may be provided with an identifying or handling tab 58 on which may be printed the designation of the particular tube to be tested. In parallel at selected positions along respective vertical strips of the card corresponding to the switch contact bars 25 to 36 inclusive there are provided punched holes, not more than one in each row, the holes being provided only in those rows corresponding to connections which are required for the particular tube to which the card applies. In the card as illustrated, square punched holes have been shown in all rows except the second from the left, the first and second rows corresponding to the contact elements 25 and 25', being two halves of the same bar and requiring only one punched opening. Obviously the number of rows used depends also upon the specific tube under test and the number of connections required. When the card is inserted, the forward end of the card engages the first row of contacts indicated by the suffix letters $a$ and thence moves on through successive contact elements $b$, $c$, $d$, etc. The resilient contacts act as guides to maintain the card in face engagement with the several contact bars and the card is maintained laterally in alignment by guide members or bars 60 at either end of the switch assembly in alignment with the slot 52. When the card has been pressed to its lowermost position, its lower or forward edge engages an actuating element 63 of the switch 42. The switch 42 is of the type which is actuated readily by slight pressure and upon closing of the switch 42 the power connection is prepared between the supply plug 37 and the primary of the transformer 41, thereby making possible the energizing of the tester by pressing the button 43 for a merit test of the tube. It will thus be apparent that energization of the tester before the card is in its final position is prevented and when the card is in its final position all connections necessary to the testing of the particular tube have been made by resilient closing of the switch elements at positions corresponding to the punchings in the card. Thus it is only necessary for the operator to press the button 43 and then read the meter 40; no further adjustment of the tester is required after the card has been inserted, the selection of the circuits being automatic.

In order to facilitate the smooth operation of the cards, they preferably are made of a material such as plastic or cardboard coated with a plastic substance which provides a relatively hard, low friction surface and may easily be pressed into position between the sets of switch contacts. Obviously any card or plate material which provides electrical insulation and has a sufficiently smooth and hard surface may be employed for the purposes of operating the tester, however, when employing cardboard, the plastic coated card is preferred in order to assure longer card life and easy operation of the tester.

While the invention has been described in connection with testing equipment for electron tubes, other applications and modifications will occur to those skilled in the art, and it is intended by the accompanying claims to cover all modifications which fall within the spirit and scope of the invention.

I claim:

1. A selector switch assembly for electric testing apparatus and the like including a plurality of switches comprising pairs of contacts normally resiliently held in engagement in a common plane, a switch selecting and actuating member comprising an insulating sheet movable laterally in said plane while lying therein for forcibly separating the contacts of said pairs of contacts, stop means for preventing the movement of said sheet beyond a predetermined position, said sheet having a plurality of openings therein affording engagement of predetermined ones of said pairs of contacts to effect engagement of the predetermined pairs of contacts when said sheet is in said predetermined position, a power supply connection, and means including a switch positioned to be actuated by said sheet on reaching said determined position for connecting said switches to said power supply connection and for interrupting the connection by the removal of said sheet.

2. A selector switch assembly as set forth in claim 1 wherein said selecting member is a relatively stiff card comprising plastic material providing a hard smooth surface.

3. A selector switch assembly as set forth in claim 1 wherein said connecting means comprises a plurality of conductor bars arranged parallel to one another and extending in the direction of movement of said selecting member, and sets of resilient contacts, one set for each of said bars, and with said bars constituting said pairs of contacts.

4. A selector switch assembly as set forth in claim 3 wherein said resilient contacts are formed to provide surfaces curved convexly toward said bars and act with said bars to constitute lateral guides for said selecting member.

References Cited in the file of this patent

UNITED STATES PATENTS

| 2,074,002 | Tauschek | Mar. 16, 1937 |
| 2,120,378 | Tauschek | June 14, 1938 |
| 2,161,598 | Torkelson | June 6, 1939 |
| 2,198,503 | Morrison | Apr. 23, 1940 |
| 2,329,491 | Sulzer | Sept. 14, 1943 |
| 2,477,741 | Haberman | Aug. 2, 1949 |
| 2,561,752 | Perdijon | July 24, 1951 |
| 2,712,309 | Offner | July 5, 1955 |
| 2,794,869 | Noregaard | June 4, 1957 |